United States Patent [19]

Rico Gonzalez

[11] 4,251,697
[45] Feb. 17, 1981

[54] KEYPAD FOR TELEPHONES

[75] Inventor: Cesar Rico Gonzalez, Madrid, Spain

[73] Assignee: Amper, S.A., Madrid, Spain

[21] Appl. No.: 1,784

[22] Filed: Jan. 8, 1979

[30] Foreign Application Priority Data

Jan. 27, 1978 [ES] Spain .............................. 233.588[U]

[51] Int. Cl.³ .......................................... H01H 13/70
[52] U.S. Cl. ................................ 200/5 A; 200/159 A; 200/247; 200/283; 200/302; 200/340
[58] Field of Search .................. 200/5 A, 159 A, 340, 200/5 R, 245–247, 275, 283, 302, 303

[56] References Cited

U.S. PATENT DOCUMENTS

| | | | |
|---|---|---|---|
| 3,780,237 | 12/1973 | Seeger, Jr. et al. | 200/5 A |
| 3,819,882 | 6/1974 | Anderson et al. | 200/159 A X |
| 3,845,254 | 10/1974 | Schneider | 200/5 A |
| 3,849,611 | 11/1974 | Walker, Jr. | 200/247 X |
| 3,870,840 | 3/1975 | Rivetta et al. | 200/283 X |
| 3,899,648 | 8/1975 | Morata | 200/5 A X |
| 4,032,739 | 6/1977 | Nicolaisen et al. | 200/246 X |
| 4,059,737 | 11/1977 | Gergaud | 200/159 A X |
| 4,085,302 | 4/1978 | Zenk et al. | 200/5 A |
| 4,099,037 | 7/1978 | Hartzler et al. | 200/5 A |

Primary Examiner—James R. Scott
Attorney, Agent, or Firm—Wenderoth, Lind & Ponack

[57] ABSTRACT

A keypad for telephones includes a case composed of two parts. One part has slots for mounting and guiding keys. The keys are arranged such that each causes the closure of two contacts which are fitted onto a substrate mounted inside the case. The contacts are installed with the assistance of a number of modular supports, each of which consists of two independent elements that are fastened together and, when joined define a means for positioning the contacts pertaining to the adjacent modular support. Means provided on the keys to cause two simultaneous closures includes two identical protuberances which are integral with the keys and protrude from diametrically opposite points of the respective bases. The keys have a positioning mechanism to restore them to their idle position, including pushing elements with an elastic action which react against the substrate where the contacts are fitted. The two component parts of the case of the assembly are coupled together in a dust-proof manner, even at the fastening points.

10 Claims, 22 Drawing Figures

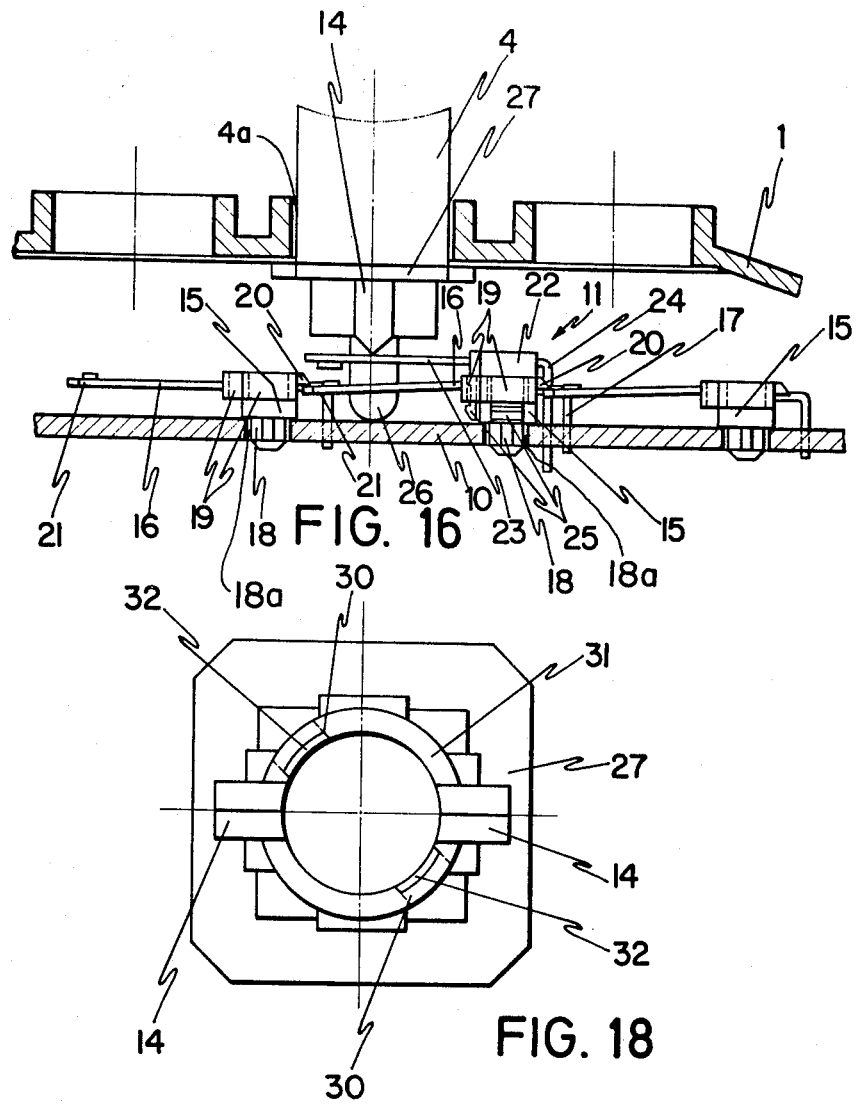
FIG. 16
FIG. 18
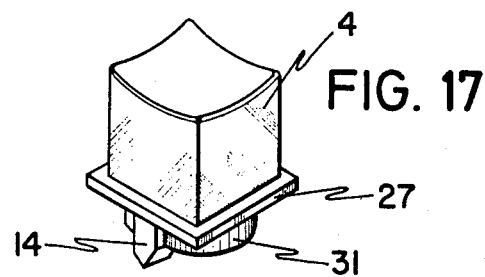
FIG. 17

KEYPAD FOR TELEPHONES

SUMMARY OF THE INVENTION

The invention is directed to a new keypad for telephones and, in particular, for subscriber telephone sets, which is structured so that depressing any one of a plurality of keys causes the closing of two contacts.

Keypads which are constructed so as to cause two contacts to close are already well known. The object of this invention is to simplify the dialling circuit and to improve the electrical characteristics, whenever the disc dial of a telephone is replaced by a keypad.

Nevertheless, the known arrangements for keypads which are capable of realizing a double closure of contacts for each pulsation are more complex than desired, particularly in the structure and operation of the keys.

Therefore, one object of the present invention is to provide a keypad which has keys which are very simple in design, and which operate directly on the contacts to be closed, with no requirement of having any kind of auxiliary device therebetween.

A second object of the present invention is to provide contacts that control the keys which are modular units disposed on independent supports and thereby facilitate the mounting of the contacts and which, in addition, include locating elements for positioning and securing the contacts which are installed on adjacent supports.

Another object of the invention is to have a body of the keypad which is a dust-proof unit, even at those points where its component parts fit together.

In order to achieve all of these objects, and others which will be stated and become evident at the end of this description, there is a conventional structure in which the keypad is made up of an assembly of two half-cases which enclose, between them, a substrate on which are mounted the closing contacts and the keypad electrical circuit; one of the half-cases has a plurality of sockets through which the keys that are for acting on the contacts can be mounted and guided in their operation. The rest of the structure however, is distinct from anything known or proposed in the prior art, in the construction of this kind of keypad.

According to the present invention, the closing contacts are mounted on modular supports in such a way that, on each side of each of the keys which move during operation, are located a pair of contacts making up a switch. In accordance with the above, the bottom part of the keys include a pair of projections, positioned diametrically opposite to each other which rest on top of these switches; these projections operate as elementary pushing elements for the upper contacts, to be described as "moving contacts" henceforth, and cause them to close an electrical circuit by contacting the lower contacts, to be described as "fixed contacts" henceforth, each time the key is operated.

The fix contacts and the moving contacts are mounted on independent parts which, nonetheless, can be joined together on assembly to make up, as a pair, a modular support wherein each moving contact is situated above a fixed contact. There are provided as many modular supports of this type, as there are rows of keys included in the keypad.

Mounting the parts which carry the moving contacts on the parts which hold the fixed contacts, is achieved by means of a series of barbed pins located on the parts which carry the moving contacts, which fit into corresponding eyelets, or retention straps, in the parts which hold the fixed contacts.

In addition, the mounting of the part which carries the fixed contacts on the substrate, is done by means of a number of ribbed protuberances which project from the lower face of said part, which are lodged, under pressure and by deformation of the ribbing, in sockets located in the substrate which are intended for this purpose.

Other noteworthy features of the proposed structure are that the keys impinge directly and elastically on the substrate, and that each modular contact support includes a series of stops that limit the elevation or upward movement of the fixed contacts corresponding to the adjoining modular support and thus guaranteeing, in this way, that there is a constant separation between these contacts and the afore-described substrate.

So that the characteristics of the proposed keypad may be more clearly understood, and the manner in which it operates, this specification is accompanied by a set of drawings wherein the following are shown:

BRIEF DESCRIPTION OF THE DRAWINGS

FIG. 16 is a cross-section view of how the parts which hold the moving and fixed contacts fit together to form modular supports and how these supports are located in the substate, and the manner in which, in conformity with the foregoing, the contacts are in position to be operated by the keys mounted through the upper half-case of the device.

FIG. 17 is a perspective view of one of the keys without elastic restoring means for resetting after depression.

FIG. 18 is a bottom view of the key of FIG. 17.

DESCRIPTION OF THE PREFERRED EMBODIMENTS

Figure 1:
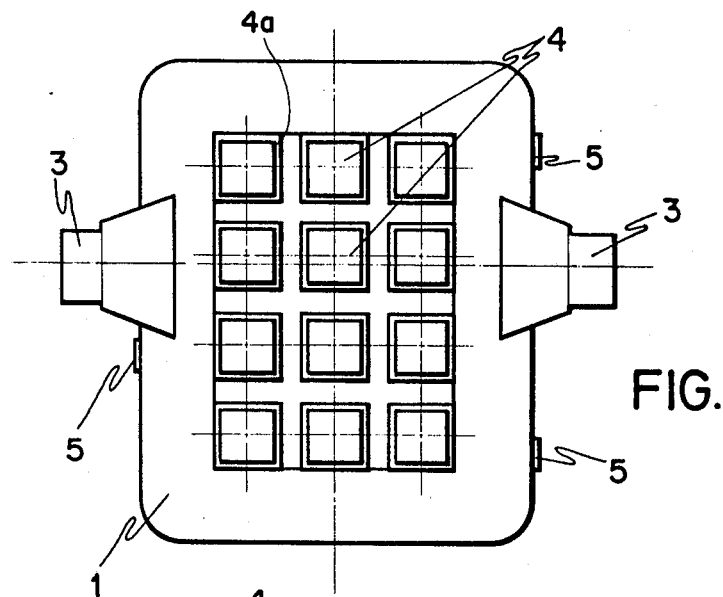
FIG. 1 shows a plan view of a keypad of the present invention.
Figure 2A:
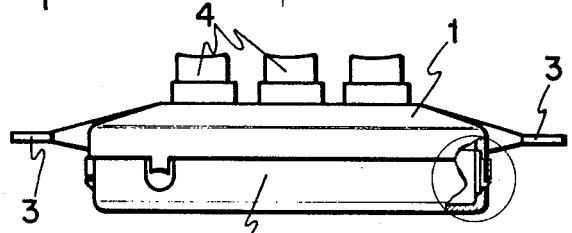
FIG. 2A is a side view in partial cross-section of the keypad of the present invention.
Figure 2B:
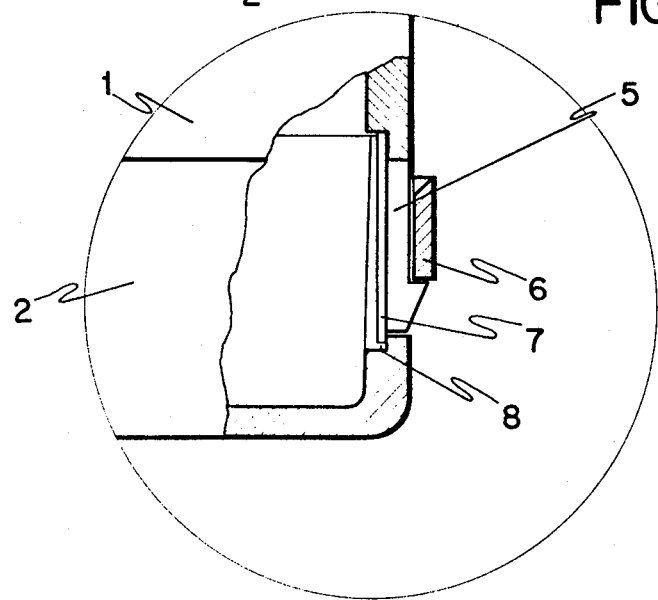
FIG. 2B is a blow-up of the portion of FIG. 2A showing in cross-section one of the points on the lower part of the case where the two parts of the case are fastened to each other.

As has already been described and can be better seen with reference to FIGS. 1 and 2, the keypad consists of an upper half-case 1 and a lower half-case 2 which enclose the substrate on which are mounted the closing switches and the dial pulse circuit which is controlled by these switches. The upper half-case 1 includes two supports 3 which allow installation in the body of the telephone set and includes sockets 4a for the mounting and guidance of the keys 4, which have a size and arrangement in accordance with normal standards.

As has already been described and can be better seen with reference to FIGS. 1 and 2, the keypad consists of an upper half-case 1 and a lower half-case 2 which enclose the substrate on which are mounted the closing switches and the dial pulse circuit which is controlled by these switches. The upper half-case 1 includes two supports 3 which allow installation in the body of the telephone set and includes sockets 4a for the mounting and guidance of the keys 4, which have a size and arrangement in accordance with normal standards.

Fastening between the upper half-case 1 and the lower half-case 2 is done in such a way that the locating elements between the two parts do not leave slits or spaces through which dust can enter the assembly. For this purpose, these locating elements are shaped like barbed pins 5, which project from and make up an integral part of the edge of the upper half-case 1; these pins hook onto straps 6 which are correspondingly located on the external side surface of the lower half-case 2. A particular feature is that these barbed pins have a collar 7 on the perimeter, which is coplanar with its rear face; this collar fits into a corresponding groove which is located on the inside face of the lower half-case.

Figure 3:
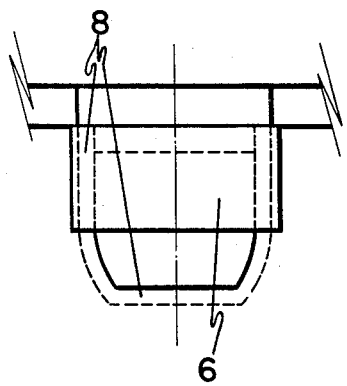
FIG. 3 is a front elevation view of the parts of the lower case where fastening occurs.
Figure 4:
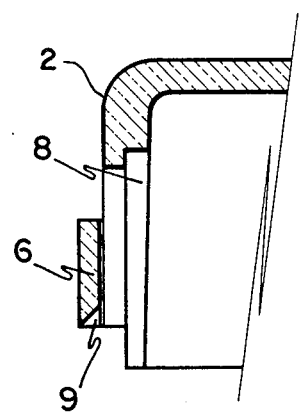
FIG. 4 is a side elevation view of the same point of FIG. 3.

The groove 8 which receives the collar 7 in the lower half-case can be seen more clearly in FIGS. 3 and 4.

Likewise, it can be appreciated that the strap 6, which retains the barbed pin 5, has a top edge which is bevelled 9, so as to allow the penetration of the pin during assembly.

Figures 5, 6:
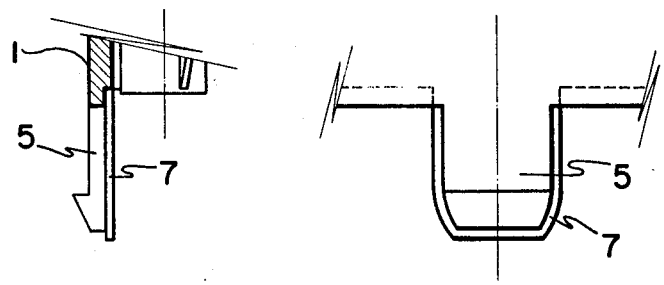
FIG. 5 is a side view of the fastening elements, located on the upper part of the case, that functions in cooperation with the parts of the lower case shown in FIGS. 3 and 4.
FIG. 6 is the same element as in FIG. 5, viewed in front elevation.

FIGS. 5 and 6, show one of the fastening pins in detail, free of the complexity of the coupling arrangements; the layout and extension of the collar 7 on the perimeter can also be more clearly observed.

Figure 7B:
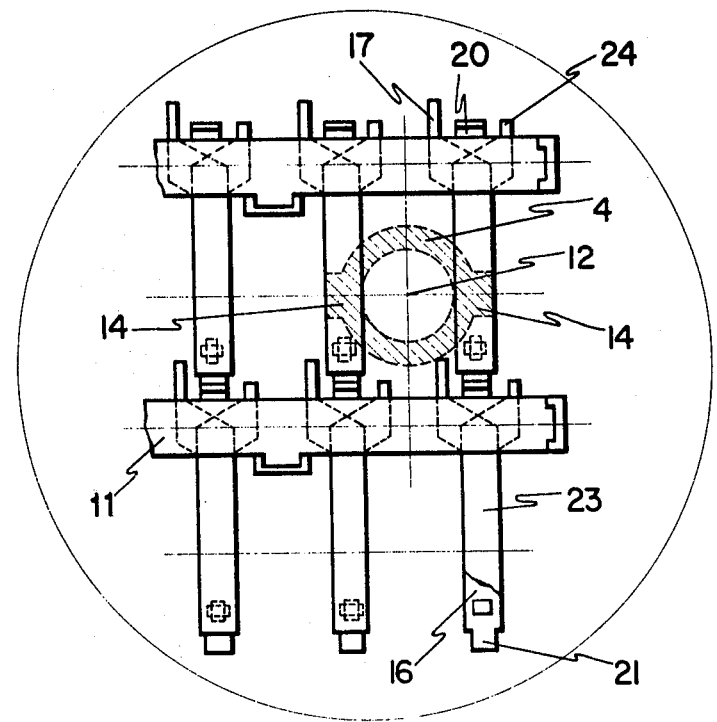
FIG. 7B is a blow-up of a portion of FIG. 7A showing the contacts enlarged with the dashed lines showing how a key acts on two of the switches to close them.
Figure 7A:
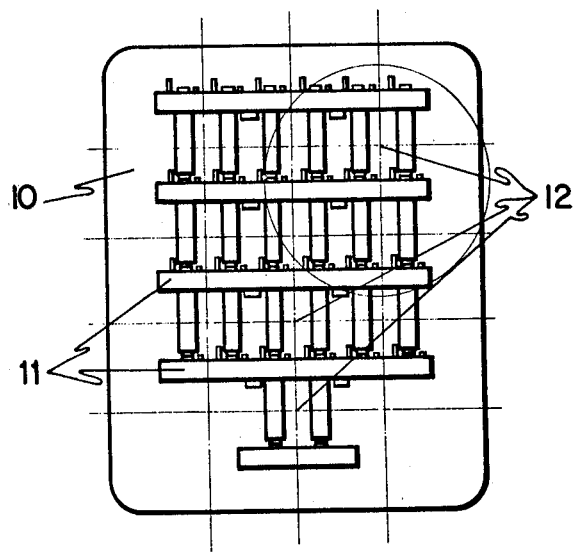
FIG. 7A is a plan view of the substrate which is fitted inside the case, illustrating the way in which the closing contacts, that make up the switches controlled by the keys, are laid out on the substrate.
Figure 8:
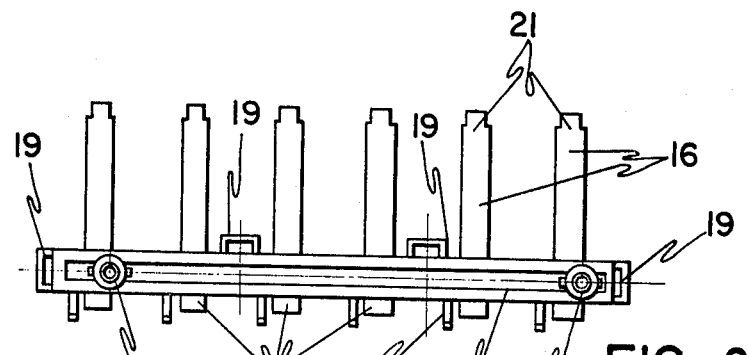
FIG. 8 is a bottom view of the part which holds the lower or fixed contacts.
Figure 10:
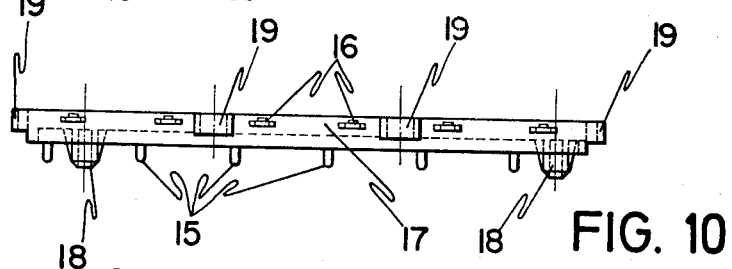
FIG. 10 is a front elevation view of the same part as FIGS. 8 and 9.
Figure 9:
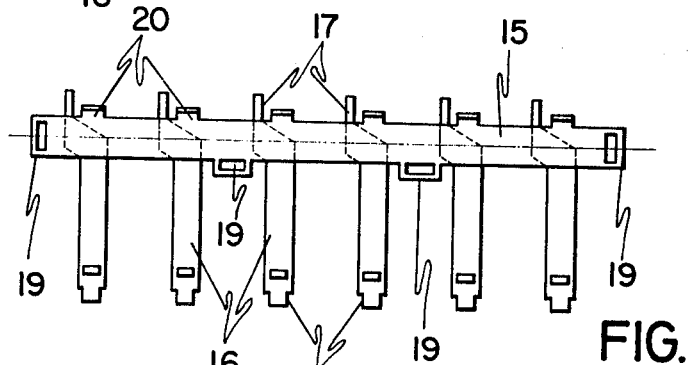
FIG. 9 is a top view of the same part as FIG. 8.
Figure 11:
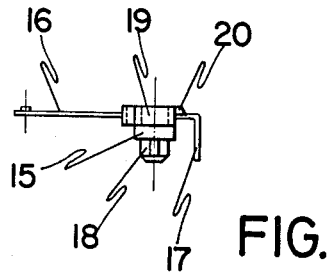
FIG. 11 is a side elevation view of the same part as shown in FIG. 10.
Figure 13:
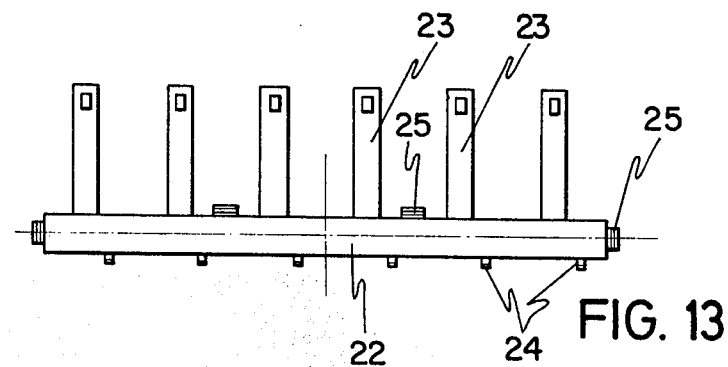
FIG. 13 is a bottom view of the same part of FIG. 12.
Figure 14:
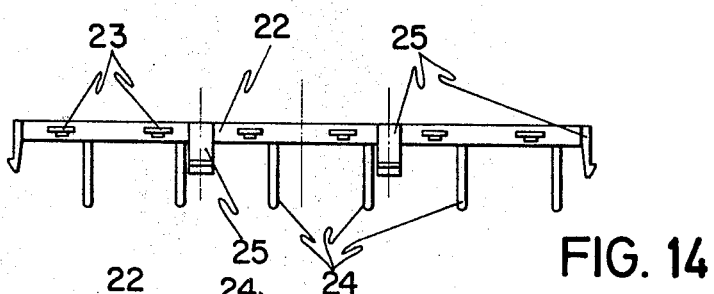
FIG. 14 is a front elevation view of the part of FIG. 12.
Figure 12:
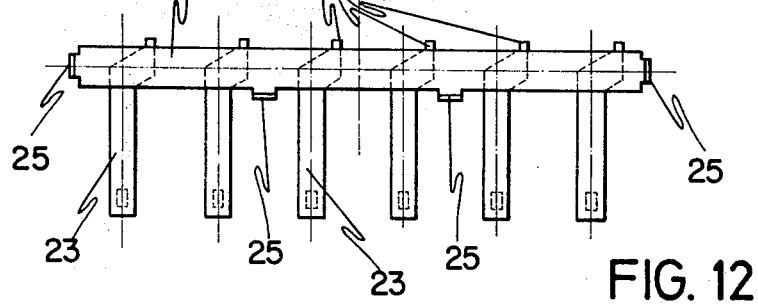
FIG. 12 is a top view of the part which holds the upper or moving contacts.
Figure 15:
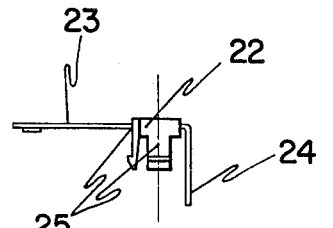
FIG. 15 is a side view of the part of FIG. 12.

Enclosed between the two half-cases 1 and 2, the coupling arrangements of which have just been discussed, is located the substrate, represented schematically in FIG. 7 and generally designed by the number 10. On the top surface of the substrate are located the closing contacts which, when operated by the keys, govern the dial pulse circuit, while on the bottom surface, which is not shown, is located the circuit itself with its associated components.

The contacts are grouped together to form as many rows as there are rows of keys on the keypad; they are mounted on the modular supports 11 in such a way that the path of travel of each of the keys, which is defined by where the lines indicated by the number 12 cross, is flanked by two switches which are made up of said contacts. In the blown up view of the figure, the dashed line shows one of the keys 4 schematically which is moveably axially with respect to the trajectory defined by the cross 12; it should be noted that by means of a pair of pushing elements 14 that are integral with the sides of the key in diametrically opposite locations, the key can, when moved, contact on the flanking switches.

The construction of the modular supports 11 that hold the contacts constituting the closing switches can be best seen in FIGS. 8 through 15 which show the characteristics of the parts of which these supports are made.

Indeed, each modular support 11 consists of a combination of two parts that incorporate, respectively, the moving contacts and the fixed contacts of each switch.

The part that incorporates the fixed contacts is shown in FIGS. 8 through 11. As can be seen therefrom, said part consists of one long member 15 which is preferably made of plastic, at one extremity of which are inserted the wafers constituting the lower contacts in a way such that they protrude through the connecting pin 17.

The parts being described include at least one pair of ribbed studs 18 for press-fitting into the corresponding orifices 18a which are located in the substrate; these studs have at least four retaining straps 19, two located at the extremities and two in the middle region, to which are fastened the prepared hooks on the part that carries the moving contacts, and which will be described later.

Finally, these parts also have a number of stops 20 which project from the other side from the contact wafers 16 and are opposite to the wafers 16. These stops operate in combination with a number of extensions 21 which are provided on the wafers (the extensions can also be seen on the drawing) to assure a uniform separation of all of the fixed contacts with respect to the substrate as will be explained hereinafter.

The part incorporating the moving contacts is similar in structure to that already described, and complementary to it.

Indeed, the moving contact part which is illustrated in FIGS. 12 through 15 also consists of an elongated member 22, that has the same length and the same width as member 15 and which, like said member 15, has a series of contact wafers having connecting pins inserted in one of its extremities. The number of members 15 coincide in number and location with the wafers 16 such that, when assembled, they lie directly above each other. As has already been described, the mounting is done by means of barbed pins 25 which work in cooperation with retaining straps 19.

The particular way in which parts 15 and 22 are assembled in order to form a modular support 11, as well as the manner in which the modular supports are fitted on the substrate and linked with the keys that operate the contacts can be seen in FIG. 16.

FIG. 16, which shows a part of the upper half-case 1 in association with the substrate 10 wherein are fitted the closing contacts, has only one key illustrated and a complete drawing has been done of only one of the modular supports that hold these contacts for purposes of simplification of the drawings and description thereof.

As can be readily appreciated, the part 22, which includes the moving contacts 23, is located directly above part 15, which holds the fixed contacts 16, these two parts are held together by the action of the barbed pins 25 and the retaining straps 19. The assembly so formed comprises a modular support 11, which is attached to the substrate 10 through the penetration of the studs 18 into the orifices 18a which are located in the substrate itself, through which also extend the connecting pins 24 and 17 of the contact wafers for being soldered into the electrical circuit which is located on the opposite face.

It can now be observed that the distance between the various modular supports is uniform and the correct positioning of which is determined by extension 21 of each fixed contact 16 being retained below one of the stops 20 of the adjacent modular support. It can also be observed that the pushing elements 14 of the keys 4 (which are also shown in FIG. 7) are located above the moving contacts 23 of each support, and the idle or rest position of the key (that is the position shown in the figure), defines the maximum elevation of the moving contacts. The combination of the stops 20 with the pushing elements 14 therefore establishes a uniform and permanent separation for all of the switches when the system is in its idle state.

The idle state of the keys 4 is defined by a restoring element 26, which acts elastically against the substrate 10, and which, with the assistance of a spring, forces the key towards a position projecting out beyond the half-case 1 through sockets 4a. In FIG. 16, this state can be clearly seen. It can also be seen that the emergency limit of the key is determined by the stop that is made up by a lower lip 27, which is integral with the key itself, contacting the inside face of the upper half-case 1.

Figure 20:
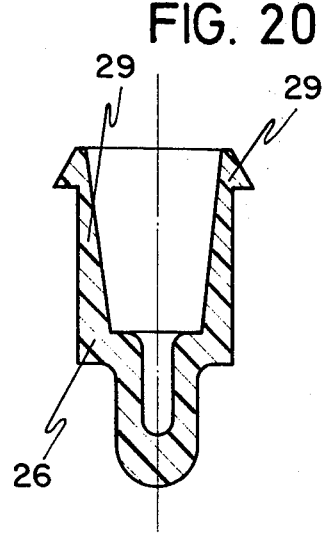
FIG. 20 is a longitudinally sectioned view of the same member of FIG. 19.
Figure 21:
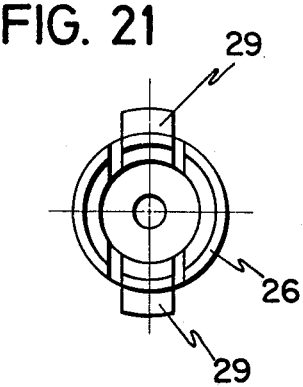
FIG. 21 is a top view of the member of FIG. 19.
Figure 22:
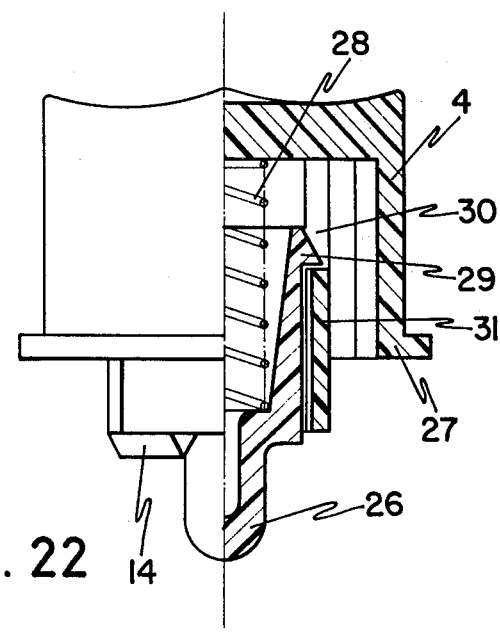
FIG. 22 is a side view in partial cross-section of a key showing how the element of FIG. 19—along with its spring—is installed inside the key.

The operating characteristics of the key can be ascertained from FIGS. 17 through 22, and particularly by viewing FIG. 22 which shows a completely assembled partially sectioned view of it.

As can be seen, each key comprises a hollow shell 31, which extends below the lip 27, the elevation limiter; on the outside of this shell is made up of the pushing elements 14, and, on the inside extremity, a pair of slots 30 which are axially disposed and located diametrically opposite each other. (In FIG. 18 can be seen the location of said slots).

Inside the key shell 31 is located a generally cylindrical part 26, which has a lower protrusion with a rounded tip. This is what constitutes the pushing and positioning element of the key.

Figure 19:
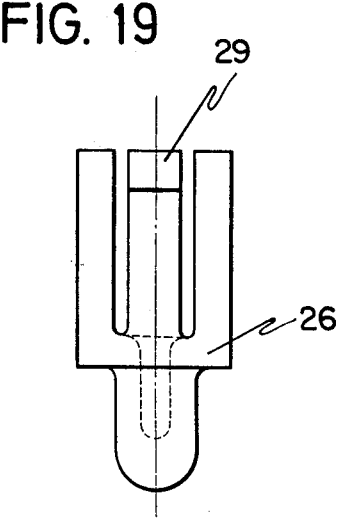
FIG. 19 is a side elevation view of a sliding pushing member which is mounted inside the key and which, with the assistance of a spring, makes up the elastic restoring means for the key of FIGS. 17 and 18.

The said pushing element 26 is shown in detail in FIGS. 19, 20 and 21, wherein it can be seen that it has a pair of pins 29 formed on the edge surface; these pins are flexible and terminate in a wedge-shaped head which projects significantly from the main body of the element (see particularly FIG. 21).

The wedge-shaped heads of the pins 29 are those which, when lodged in the axial openings 30 of the key shell 31, prevent the pushing element from coming out once it has been mounted therein and a spring 8 is inserted between its base and the lower face of the key; this can be seen in FIG. 22.

Assembly of pushing element 26 is facilitated by the provision of bevelled edges 32 which are located on the inside face of the lower edge of the shell (see FIG. 18). In this way, the wedge-shaped heads of the pins 29 can be more easily inserted.

The operation of a keypad, as proposed in this invention, can be clearly understood from the description of the apparatus to this point.

While the system is in the idle state, the keys are held in the raised position by their respective pushing elements 26 (see FIG. 16) and the moving and fixed contacts are separated one from the other by a pre-established fixed amount which is specified, as has already been seen, by the interaction of the stops 20 and the pushing elements 16.

When any one key is depressed, it pushes directly through wedges 14 on the two moving contacts 23 which flank it (see also FIG. 7) until they are brought into electrical contact with the fixed contacts. From this moment, and as long as the key continues to be depressed the moving contacts are in contact with the fixed ones; the latter are somewhat separated from the substrate and flex until they come into contact with it—acting in this way, to a slight extent, in response to the key depression and thereby ensuring good electical contact at all times.

When the key is released, reaction of the spring 28, in combination with the pushing element 26, causes the key to return to its idle position; the contacts 16 and 23 are then restored by their own elasticity to their idle positions.

It is considered unnecessary to further continue this description in order to explain exactly the concept of the present invention which is defined in the following claims.

I claim:

1. A keypad for use in telephones or the like, said keypad comprising:
   a casing made up of a top half casing and a bottom half casing and said top half casing having a plurality of openings therein, said top and bottom half casings having fastening means for being fastened to each other in a dust-proof manner;
   a base substrate mounted within said casing;
   a plurality of keys, each key of said plurality of keys extending respectively and being guided through corresponding ones of said plurality of openings in said top half casing, said base substrate having a plurality of contacts thereon and each of said keys being for closing two respective pairs of contacts of said plurality of contacts;
   modular support means for supporting corresponding pairs of said contacts on said base substrate, said modular support means being made up of two modular elements which are fastened together for specifically positioning said corresponding pairs of such said contacts, and each of said keys having corresponding two protuberances extending from the base of said keys for closing two respective pairs of said contacts when said keys are actuated by being depressed; and
   elastic restoring means which act against said substrate for causing said keys to return to an idle position after said keys have been depressed and thereby allowing opening of said corresponding pairs contacts.

2. A keypad as claimed in claim 1 wherein said pair of contacts which are supported by said modular support means comprises a fixed contact and a movable contact.

3. A keypad as claimed in claim 2 wherein said base substrate has a plurality of receiving orifices having a plurality of projecting studs respectively received therein, said studs extending from and supporting said modular elements which support said fixed contacts so as to have said fixed contacts spaced a specified amount from said base substrate for allowing a specified degree of movement of said fixed contacts when said keys are depressed and each of said projecting studs having at least one pair of deformable ribs for being locked into the walls of said orifices in said base substrate.

4. A keypad as claimed in claim 2 or 3 wherein said modular support means further comprises at least four barbed pins located on said modular elements which support said moving contacts, two of said pins being located at the extremities of said modular elements which support said moving contacts and two of said pins located in the central area thereof, said modular elements which support said fixed contacts having retaining straps respectively for engaging said pins for thereby securing both said respective modular elements together.

5. A keypad as claimed in claim 3 further comprising a plurality of horizontal stops which extend respectively from each of said modular elements which support a fixed contact for retaining fixed contacts of adjacent modular elements at their free end for ensuring uniform separation between said fixed contacts and said moving contacts.

6. A keypad as claimed in claim 5 wherein said fixed contacts further comprise extended portions at the free ends thereof for having said fixed contacts retained by said stops on said adjacent modular elements.

7. A keypad as claimed in claim 1 wherein said pairs of contacts comprise a fixed contact and a movable contact which are positioned below said keys so that each of said two protuberances of each of said keys engages a respective movable contact when said keys are depressed for closing two of said pairs of contacts when said keys are depressed.

8. A keypad as claimed in claim 7 wherein said key protuberances contact said movable contacts when said keys are not depressed for maintaining said movable contacts at a specified idle position.

9. A keypad as claimed in claim 1 wherein said elastic restoring means comprises a cylindrical element positioned within the core of said keys which is axially slidable within said core, said cylindrical element having a projection which extends downward and said cylindrical element further having a spring housed therein for urging said cylindrical element and corresponding projection downward against said substrate, said cylindrical element having wedge shaped points at the top thereof and said keys having axial slots within the core walls for being engaged by said wedge shaped points for limiting downward movement of said cylindrical elements.

10. A keypad as claimed in claim 1 wherein said fastening means for said top and bottom half casings comprises tongues which project from said top half casing, said bottom half casing having eyelets for receiving said tongues and latching said tongues therein, each said tongues having a collar about its perimeter which is coplanar with its rear face, said bottom half casing having recesses at said point where said eyelets are located for receiving said collar for causing said casing to be dustproof when said top and bottom half casings are attached together.

* * * * *